US012624550B2

(12) United States Patent
Kragten et al.

(10) Patent No.: US 12,624,550 B2
(45) Date of Patent: *May 12, 2026

(54) COATED ROOFING GRANULES, ROOFING MATERIALS MADE THEREFROM AND METHODS OF PREPARING COATED ROOFING GRANULES

(71) Applicant: SPECIALTY GRANULES INVESTMENTS LLC, Parsippany, NJ (US)

(72) Inventors: David D. Kragten, Burnsville, NC (US); Daniel E. Rardon, Greencastle, PA (US)

(73) Assignee: Specialty Granules Investments LLC, Parsippany, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/792,105

(22) Filed: Aug. 1, 2024

(65) Prior Publication Data

US 2024/0392569 A1    Nov. 28, 2024

Related U.S. Application Data

(60) Continuation of application No. 18/332,231, filed on Jun. 9, 2023, now Pat. No. 12,084,864, which is a continuation of application No. 17/488,925, filed on Sep. 29, 2021, now Pat. No. 11,718,991, which is a division of application No. 16/803,544, filed on Feb. 27, 2020, now Pat. No. 11,136,760.

(51) Int. Cl.
| *E04D 1/20* | (2006.01) |
| *C09D 133/04* | (2006.01) |
| *E04D 1/00* | (2006.01) |

(52) U.S. Cl.
CPC ............. *E04D 1/20* (2013.01); *C09D 133/04* (2013.01); *E04D 2001/005* (2013.01)

(58) Field of Classification Search
None
See application file for complete search history.

(56) References Cited

U.S. PATENT DOCUMENTS

| 3,888,684 | A | 6/1975 | Little |
| 4,092,441 | A | 5/1978 | Meyer et al. |
| 4,359,505 | A | 11/1982 | Joedicke |
| 4,378,408 | A | 3/1983 | Joedicke |
| 5,240,760 | A | 8/1993 | George et al. |
| 5,286,544 | A | 2/1994 | Graham |
| 5,316,824 | A | 5/1994 | George et al. |
| 5,362,566 | A | 11/1994 | George et al. |
| 5,380,552 | A | 1/1995 | George et al. |
| 5,427,793 | A | 6/1995 | Bigham et al. |
| 5,584,921 | A | 12/1996 | Wagner et al. |
| 5,723,516 | A | 3/1998 | Bigham et al. |
| 6,607,781 | B2 | 8/2003 | Joedicke |

| 6,620,214 | B2 | 9/2003 | McArdle et al. |
| 7,070,844 | B2 | 7/2006 | Bartek |
| 7,125,601 | B1 | 10/2006 | Pinault et al. |
| 7,241,500 | B2 | 7/2007 | Shiao et al. |
| 7,452,598 | B2 | 11/2008 | Shiao et al. |
| 7,455,899 | B2 | 11/2008 | Gross et al. |
| 8,034,432 | B2 | 10/2011 | Joedicke |
| 8,058,342 | B1 | 11/2011 | Stevens et al. |
| 8,124,231 | B2 | 2/2012 | Fan et al. |
| 8,168,032 | B2 | 5/2012 | Kalkanoglu et al. |
| 8,216,681 | B2 | 7/2012 | Mellott, II et al. |
| 8,277,881 | B2 | 10/2012 | Khan et al. |
| 8,298,674 | B2 | 10/2012 | Elgarhy |
| 8,394,730 | B2 | 3/2013 | Grube et al. |
| 8,507,092 | B2 | 8/2013 | Fan et al. |
| 8,530,034 | B2 | 9/2013 | Khan et al. |
| 8,568,524 | B2 | 10/2013 | Li et al. |
| 8,637,116 | B2 | 1/2014 | Shiao et al. |
| 9,044,921 | B2 | 6/2015 | Kalkanoglu et al. |
| 9,067,244 | B2 | 6/2015 | Ruffine et al. |
| 9,248,472 | B2 | 2/2016 | Viasnoff |
| 9,303,407 | B2 | 4/2016 | Sexauer et al. |
| 9,511,566 | B2 | 12/2016 | Grube et al. |
| 9,624,131 | B1 | 4/2017 | Dubey et al. |
| 9,670,677 | B2 | 6/2017 | Shiao et al. |
| 9,682,888 | B2 | 6/2017 | Faure |
| 9,732,000 | B2 | 8/2017 | Stratton et al. |
| 9,890,288 | B2 | 2/2018 | Jenree et al. |
| 9,980,480 | B2 | 5/2018 | Vanpoulle et al. |
| 10,094,115 | B2 | 10/2018 | Shiao et al. |
| 10,203,434 | B2 | 2/2019 | Constantz et al. |
| 10,214,449 | B2 | 2/2019 | Kalkanoglu et al. |
| 10,253,493 | B2 | 4/2019 | Jenree et al. |
| 10,309,111 | B2 | 6/2019 | Shiao et al. |
| 10,584,494 | B2 | 3/2020 | Wise et al. |
| 11,136,760 | B2 * | 10/2021 | Kragten .................... E04D 1/20 |
| 11,718,991 | B2 * | 8/2023 | Kragten ............... C09D 133/04 |
| | | | 428/327 |
| 12,084,864 | B2 * | 9/2024 | Kragten .................... E04D 1/20 |
| 2007/0110961 | A1 | 5/2007 | Fensel et al. |
| 2008/0131664 | A1 | 6/2008 | Teng et al. |
| 2011/0223385 | A1 | 9/2011 | Shiao et al. |
| 2013/0168616 | A1 * | 7/2013 | Shiao ..................... C09C 3/063 |
| | | | 427/213 |

(Continued)

FOREIGN PATENT DOCUMENTS

| CA | 2545903 C | 2/2015 |
| WO | 2011041033 A1 | 4/2011 |

(Continued)

OTHER PUBLICATIONS

Canadian Office Action issued in corresponding Canadian Application No. 3110363 dated Feb. 9, 2022.

*Primary Examiner* — Sheeba Ahmed
(74) *Attorney, Agent, or Firm* — Venable LLP

(57) ABSTRACT

This invention relates to coated roofing granules, roofing materials made therefrom, and methods of preparing such coated roofing granules. By coating roofing granules with an aqueous coating that includes water, a silicon-containing oligomer or polymer, and an acrylic resin, coated roofing granules can be prepared that exhibit reduced staining as compared to traditional roofing granules that are treated with petroleum oil.

27 Claims, 3 Drawing Sheets

(56)          References Cited

U.S. PATENT DOCUMENTS

| | | |
|---|---|---|
| 2014/0038481 A1 | 2/2014 | Chen et al. |
| 2015/0113901 A1 | 4/2015 | Bai et al. |
| 2015/0307668 A1 | 10/2015 | Kalgutkar et al. |
| 2016/0265230 A1 | 9/2016 | Bai et al. |
| 2017/0037273 A1 | 2/2017 | Ali et al. |
| 2017/0175326 A1 | 6/2017 | Zhou |
| 2017/0232423 A1 | 8/2017 | Bai et al. |
| 2018/0258645 A1* | 9/2018 | Hong ...................... E04D 7/005 |
| 2019/0062587 A1 | 2/2019 | Shen et al. |
| 2019/0323240 A1 | 10/2019 | Gomes et al. |
| 2020/0002228 A1 | 1/2020 | Madec et al. |
| 2020/0064517 A1 | 2/2020 | Joedicke et al. |
| 2020/0172757 A1* | 6/2020 | Shen ........................ C08K 9/04 |
| 2020/0308413 A1 | 10/2020 | Jenree et al. |

FOREIGN PATENT DOCUMENTS

| | | | |
|---|---|---|---|
| WO | 2015112590 A1 | 7/2015 |
| WO | 2017210431 A1 | 12/2017 |
| WO | 2018154070 A1 | 8/2018 |

* cited by examiner

| | Control | C1 | C2 | C3 | C4 | C5 | C6 | C7 | C8 | C9 | C10 | C11 | C12 | C13 | C14 | C15 | C16 | C17 | C18 |
|---|---|---|---|---|---|---|---|---|---|---|---|---|---|---|---|---|---|---|---|
| Granule | | | | | | | | | | | | | | | | | | | |
| Granule Color — L | 52.3 | | | | | | | | | | | | | | | | | | |
| — a | -1.8 | | | | | | | | | | | | | | | | | | |
| — b | -1.5 | | | | | | | | | | | | | | | | | | |
| TSR | 0.3 | | | | | | | | | | | | | | | | | | |
| Dust (PPM) | 39 | | | | | | | | | | | | | | | | | | |
| Post treatment - PPT | | | | | | | | | | | | | | | | | | | |
| Water | 0 | 23.3 | 24.0 | 23.5 | 24.1 | 23.7 | 24.2 | 23.7 | 24.2 | 23.6 | 24.2 | 23.7 | 24.2 | 23.7 | 24.2 | 23.7 | 24.2 | 23.4 | 24.1 |
| Paraffinic oil | 5.5 | | | | | | | | | | | | | | | | | | |
| BS16 | 0.1 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |
| Joncryl 1987 | | 1.4 | 0.7 | | | | | | | | | | | | | | | | |
| Joncryl 2561 | | | | 1.3 | 0.6 | | | | | | | | | | | | | | |
| Rhoplex AC2540 | | | | | | 1.1 | 0.5 | | | | | | | | | | | | |
| Rhoplex EC2100 | | | | | | | | 1.1 | 0.5 | | | | | | | | | | |
| Rhoplex AC630 | | | | | | | | | | 1.2 | 0.6 | | | | | | | | |
| Rovace 10 | | | | | | | | | | | | 1.1 | 0.5 | | | | | | |
| Rovace 661 | | | | | | | | | | | | | | 1.1 | 0.5 | | | | |
| Rovace 9100 | | | | | | | | | | | | | | | | 1.1 | 0.5 | | |
| Tape-X | | | | | | | | | | | | | | | | | | 1.3 | 0.7 |
| Total | 5.6 | 25 | 25 | 25 | 25 | 25 | 25 | 25 | 25 | 25 | 25 | 25 | 25 | 25 | 25 | 25 | 25 | 25 | 25 |
| Testing | | | | | | | | | | | | | | | | | | | |
| Granule Color — L | 48.3 | 51.8 | 52.1 | 51.9 | 52.3 | 51.7 | 51.7 | 51.8 | 52.0 | 51.8 | 51.6 | 52.3 | 52.1 | 52.2 | 52.2 | 52.2 | 52.1 | 52.2 | 52.0 |
| — a | -1.8 | -1.9 | -1.9 | -1.9 | -1.9 | -1.9 | -1.9 | -1.9 | -1.9 | -1.9 | -1.9 | -1.9 | -1.9 | -1.9 | -1.9 | -1.9 | -1.9 | -1.9 | -1.9 |
| — b | -0.8 | -1.4 | -1.4 | -1.3 | -1.4 | -1.3 | -1.3 | -1.3 | -1.4 | -1.2 | -1.4 | -1.3 | -1.4 | -1.4 | -1.3 | -1.4 | -1.3 | -1.3 | -1.3 |
| TSR | 0.26 | 0.29 | 0.29 | 0.29 | 0.29 | 0.28 | 0.29 | 0.28 | 0.28 | 0.29 | 0.29 | 0.29 | 0.29 | 0.29 | 0.29 | 0.30 | 0.29 | 0.30 | 0.29 |
| Oil backoff — L | 49.3 | 52.3 | 52.3 | 52.5 | 52.4 | 51.9 | 52.3 | 52.2 | 52.2 | 52.3 | 52.3 | 52.2 | 52.3 | 52.4 | 52.3 | 52.5 | 52.1 | 52.4 | 52.1 |
| — a | -1.8 | -1.9 | -1.9 | -1.9 | -1.9 | -1.9 | -1.9 | -1.9 | -1.9 | -1.9 | -1.9 | -1.9 | -1.9 | -1.9 | -1.9 | -1.9 | -1.9 | -1.9 | -1.9 |
| — b | -0.7 | -1.4 | -1.4 | -1.3 | -1.3 | -1.3 | -1.3 | -1.3 | -1.4 | -1.3 | -1.3 | -1.2 | -1.4 | -1.3 | -1.3 | -1.2 | -1.4 | -1.3 | -1.3 |
| TSR | 0.27 | 0.29 | 0.30 | 0.30 | 0.30 | 0.29 | 0.30 | 0.29 | 0.29 | 0.30 | 0.30 | 0.29 | 0.30 | 0.30 | 0.30 | 0.30 | 0.30 | 0.30 | 0.29 |
| Water repellency (min) | 58 | 60+ | 60+ | 60+ | 60+ | 60+ | 60+ | 60+ | 60+ | 60+ | 60+ | 3 | 4 | 1 | >1 | 13 | 30 | 5 | 19 |
| Dust (PPM), as made | 17 | 0 | 6 | 14 | 22 | 11 | 4 | 0 | 10 | 1 | 12 | 0 | 4 | 10 | 13 | 11 | 18 | 11 | 4 |
| Dust (PPM), after backoff | 23 | 19 | 18 | 25 | 26 | 21 | 13 | 11 | 20 | 15 | 28 | 10 | 15 | 0 | 10 | 12 | 13 | 12 | 26 |
| Stain, 24hr | 9 | 3 | 4 | 1 | 1 | 2 | 2 | 2 | 2 | 2 | 3 | 2 | 3 | 2 | 3 | 2 | 3 | 2 | 2 |

All material quantities are pounds per ton (PPT) of the roofing granules.

*FIG. 1*

| | | Control | C1 | C2 | C3 | C4 | C5 | C6 | C7 | C8 | C9 | C10 | C11 | C12 | C13 | C14 | C15 |
|---|---|---|---|---|---|---|---|---|---|---|---|---|---|---|---|---|---|
| Granule | | | | | | | | | | | | | | | | | |
| Granule Color | L | 52.3 | | | | | | | | | | | | | | | |
| | a | -1.8 | | | | | | | | | | | | | | | |
| | b | -1.5 | | | | | | | | | | | | | | | |
| TSR | | 0.3 | | | | | | | | | | | | | | | |
| Dust (PPM) | | 39 | | | | | | | | | | | | | | | |
| Post treatment - PPT | | | | | | | | | | | | | | | | | |
| Water | | 0 | 22.7 | 23.1 | 23.6 | 23.3 | 23.8 | 22.7 | 23.1 | 23.6 | 23.3 | 23.8 | 22.7 | 23.1 | 23.6 | 23.3 | 23.8 |
| Paraffinic oil | | 5.5 | | | | | | | | | | | | | | | |
| BS58 | | 0.1 | | | | | | | | | | | | | | | |
| BS16 | | 0.50 | 0.50 | 0.50 | 0.50 | 0.38 | 0.25 | 0.50 | 0.50 | 0.50 | 0.38 | 0.25 | 0.50 | 0.50 | 0.50 | 0.38 | 0.25 |
| Rhoplex AC2540 | | 1.8 | 1.8 | 1.4 | 0.9 | 1.4 | 0.9 | | | | | | | | | | |
| Rhoplex EC2100 | | | | | | | | 1.8 | 1.4 | 0.9 | 1.4 | 0.9 | | | | | |
| Rhoplex AC630 | | | | | | | | | | | | | 1.8 | 1.4 | 0.9 | 1.4 | 0.9 |
| Total | | 5.6 | 25 | 25 | 25 | 25 | 25 | 25 | 25 | 25 | 25 | 25 | 25 | 25 | 25 | 25 | 25 |
| Testing | | | | | | | | | | | | | | | | | |
| Granule Color | L | 48.7 | 52.1 | 51.8 | 52 | 51.7 | 52.1 | 51.9 | 52.1 | 52.2 | 51.9 | 52 | 52.1 | 52.1 | 51.9 | 52.4 | 52.1 |
| | a | -1.8 | -1.9 | -1.9 | -1.9 | -1.9 | -1.8 | -1.9 | -1.9 | -1.9 | -1.9 | -1.9 | -1.9 | -1.9 | -1.9 | -1.9 | -1.8 |
| | b | -0.8 | -1.2 | -1.3 | -1.4 | -1.2 | -1.2 | -1.2 | -1.3 | -1.4 | -1.3 | -1.3 | -1.3 | -1.3 | -1.4 | -1.4 | -1.4 |
| TSR | | 0.27 | 0.29 | 0.29 | 0.29 | 0.29 | 0.29 | 0.30 | 0.29 | 0.29 | 0.29 | 0.29 | 0.29 | 0.29 | 0.29 | 0.30 | 0.29 |
| Oil backoff | L | 49.8 | 52.2 | 52.2 | 52.5 | 52.2 | 52.8 | 52.2 | 52.8 | 52.2 | 52.1 | 52.5 | 52.5 | 52.9 | 52.6 | 52.6 | 52.6 |
| | a | -1.8 | -1.9 | -1.9 | -1.9 | -1.9 | -1.9 | -1.9 | -1.9 | -1.9 | -1.9 | -1.9 | -1.9 | -1.9 | -1.9 | -1.9 | -1.9 |
| | b | -0.7 | -1.2 | -1.3 | -1.4 | -1.3 | -1.3 | -1.2 | -1.2 | -1.3 | -1.3 | -1.4 | -1.4 | -1.3 | -1.5 | -1.4 | -1.4 |
| TSR | | 0.27 | 0.29 | 0.29 | 0.29 | 0.29 | 0.30 | 0.28 | 0.30 | 0.29 | 0.29 | 0.30 | 0.29 | 0.30 | 0.29 | 0.29 | 0.30 |
| Water repellency (min) | | 60+ | 60+ | 60+ | 60+ | 60+ | 60+ | 60+ | 60+ | 60+ | 60+ | 60+ | 60+ | 60+ | 60+ | 60+ | 60+ |
| Dust (PPM), as made | | 21 | 1 | 1 | 0 | 3 | 12 | 14 | 0 | 16 | 12 | 20 | 15 | 25 | 21 | 22 | 17 |
| Dust (PPM), after backoff | | 19 | 12 | 5 | 2 | 28 | 14 | 11 | 0 | 27 | 18 | 16 | 10 | 12 | 22 | 9 | 13 |
| Stain, 24hr | | 8 | 1 | 1 | 1 | 2 | 2 | 1 | 1.5 | 2 | 2 | 3 | 2 | 1 | 1.5 | 3 | 4 |
| Stain, 4d | | 10 | 4 | 3 | 3 | 4.5 | 6 | 3 | 3 | 4 | 5 | 7 | 4 | 3 | 4 | 4.5 | 7 |

All material quantities are pounds per ton (PPT) of the roofing granules.

*FIG. 2*

| | | Control Coating 1 | C1(1) | C2(1) | C3(1) | C4(1) | C5(1) | Control Coating 2 | C1(2) | C2(2) | C3(2) | C4(2) | C5(2) | Control Coating 3 | C1(3) | C2(3) | C3(3) | C4(3) | C5(3) | C6(3) |
|---|---|---|---|---|---|---|---|---|---|---|---|---|---|---|---|---|---|---|---|---|
| Granule | L | 43.6 | | | | | | 31.0 | | | | | | 31.8 | | | | | | |
| | a | -2.9 | | | | | | -0.3 | | | | | | -0.3 | | | | | | |
| | b | 2.8 | | | | | | -2 | | | | | | -2 | | | | | | |
| Post treatment - PPT | | | | | | | | | | | | | | | | | | | | |
| Paraffinic oil | | 4.7 | | | | | | 5.3 | | | | | | 5.3 | | | | | | |
| 8568 | | 0.06 | | | | | | 0.06 | | | | | | 0.3 | | | | | | |
| Water | | | 20 | 20 | 20 | 20 | 20 | | 20 | 20 | 20 | 20 | 20 | | 20 | 20 | 20 | 20 | 20 | 20 |
| 8516 | | | 0.5 | 0.5 | 0.5 | 0.5 | 0.5 | | 0.5 | 0.5 | 0.5 | 0.5 | 0.5 | | 0.5 | 0.5 | 0.5 | 0.5 | 0.5 | 0.5 |
| Rhoplex AC530 | | | 2 | 2 | 2 | 2 | 2 | | 2 | 2 | 2 | 2 | 2 | | 2 | 2 | 2 | 2 | 2 | 2 |
| Total | | 4.71 | 24.5 | 25.5 | 26.5 | 27.5 | 28.0 | 5.4 | 24.5 | 25.5 | 26.5 | 27.5 | 28.0 | 5.6 | 22.5 | 22.5 | 22.5 | 22.5 | 22.5 | 22.5 |
| Oil top dress | | | | | | | | | | | | | | | | | | | | |
| Paraffinic oil | | | 2.0 | 3.0 | 4.0 | 5.0 | 5.5 | | 2.0 | 3.0 | 4.0 | 5.0 | 5.5 | | 0 | 2.0 | 3.0 | 4.0 | 5.0 | 5.3 |
| Testing | | | | | | | | | | | | | | | | | | | | |
| Granule Color | L | 38.6 | 41.5 | 40.1 | 38.8 | 38.3 | 37.4 | 25.3 | 28.5 | 27.7 | 27.2 | 26.9 | 26.7 | 27.2 | 30.5 | 28.6 | 28.2 | 27.8 | 27.4 | 27.3 |
| | a | -2.9 | -3.0 | -3.0 | -2.9 | -3.0 | -2.9 | -0.3 | -0.2 | -0.2 | -0.2 | -0.3 | -0.3 | -0.3 | -0.2 | -0.2 | -0.3 | -0.2 | -0.3 | -0.2 |
| | b | 3.4 | 3.4 | 3.4 | 3.4 | 3.4 | 3.4 | -1.3 | -1.4 | -1.4 | -1.4 | -1.4 | -1.3 | -1.5 | -1.7 | -1.4 | -1.4 | -1.5 | -1.4 | -1.5 |
| Oil backoff | L | 40.3 | 43.0 | 41.9 | 40.4 | 39.4 | 38.5 | 28.0 | 29.9 | 29.0 | 28.2 | 27.6 | 26.9 | 27.7 | 30.7 | 29.5 | 28.7 | 28.1 | 27.4 | 27.5 |
| | a | -2.9 | -3.0 | -3.0 | -2.9 | -2.9 | -3.0 | -0.3 | -0.3 | -0.3 | -0.3 | -0.3 | -0.3 | -0.3 | -0.3 | -0.3 | -0.3 | -0.2 | -0.3 | -0.3 |
| | b | 3.1 | 3.2 | 3.3 | 3.4 | 3.3 | 3.3 | -1.5 | -1.6 | -1.5 | -1.4 | -1.3 | -1.4 | -1.5 | 1.7 | -1.5 | -1.5 | -1.6 | -1.6 | -1.5 |
| Water repellency (min), as made | | 60+ | 4 | 4 | 4 | 4 | 4 | 60+ | 6 | 5 | 4 | 5 | 5 | 60+ | 60+ | 12 | 11 | 14 | 25 | 23 |
| Dust (PPM), as made | | 11 | 9 | 3 | 2 | 0 | 0 | 1 | 12 | 1 | 2 | 1 | 1 | 3 | 11 | 7 | 4 | 6 | 1 | 1 |
| Stain, 24hr | | 5 | 0 | 0 | 0 | 1 | 0 | 2 | 0 | 0 | 0 | 0 | 0 | 0 | 0 | 0 | 0 | 0 | 0 | 0 |
| Stain, 4d | | 9 | 3.5 | 4 | 5 | 6 | 6 | 7 | 0 | 0 | 2 | 0 | 1 | 5 | 0 | 0 | 0 | 0 | 0 | 0 |

All material quantities are pounds per ton (PPT) of the roofing granules.

*FIG. 3*

COATED ROOFING GRANULES, ROOFING MATERIALS MADE THEREFROM AND METHODS OF PREPARING COATED ROOFING GRANULES

FIELD OF THE INVENTION

This invention relates to coated roofing granules, roofing materials made therefrom, and methods of preparing such coated roofing granules. By coating roofing granules with an aqueous coating that includes water, a silicon-containing oligomer or polymer, and an acrylic resin, coated roofing granules can be prepared that exhibit reduced staining as compared to traditional roofing granules that are treated with petroleum oil. Roofing materials, such as, e.g., shingles, made using these coated roofing granules also exhibit superior properties of, for example, reduced staining, improved color, improved solar reflectance, water repellency, and/or reduced dust content, as compared to roofing materials having traditional roofing granules that are treated with petroleum oil.

BACKGROUND OF THE INVENTION

Traditional roofing materials, such as, e.g., shingles, are based upon a glass or felt mat that is coated and impregnated with an asphalt-based composition that is coated with granules. The granules serve to protect and provide coloring to the asphalt-based roofing material. For example, granules serve to provide coloring to shingles and rolled roofing products and thus, to the roof itself. Additionally, granules generally protect the underlying asphalt coating from damage due to exposure to light, in particular, ultraviolet (UV) light. That is, the granules reflect light and protect the asphalt from deterioration by photo-degradation. In addition, the granules improve fire resistance and weathering characteristics. In general, granules are embedded in the coating asphalt by the application of pressure and are retained therein by adherence to the asphalt.

In asphalt-based roofing materials, as granules are secured to the asphalt surface, there is a tendency for oils in the asphalt surface to creep onto or be adsorbed on the granules' surfaces. This creeping or adsorption of the asphalt oils on the granules' surface causes discoloration or staining of the granules and hence reduces the aesthetic effect of the roofing materials.

There is thus a need for an aqueous coating for roofing granules that results in coated roofing granules that exhibit reduced staining, as well as improved color, improved solar reflectance, water repellency, and/or reduced dust content, as compared to traditional roofing granules that are treated with petroleum oil.

SUMMARY OF THE INVENTION

One embodiment of this invention pertains to a method of coating roofing granules that includes (a) obtaining roofing granules and (b) applying a coating to the roofing granules to form coated roofing granules, with the coating comprising (i) water, (ii) at least one silicon-containing oligomer or silicon-containing polymer, and (iii) an acrylic resin having a glass transition temperature of −18° C. to 60° C. When the coated roofing granules are applied to an asphalt shingle, the coated roofing granules exhibit reduced staining as compared to roofing granules that are treated with petroleum oil.

In one embodiment, the at least one silicon-containing oligomer or silicon-containing polymer is at least one of polyoctyltrimethoxysilane, potassium methyl siliconate, polymethylhydrogensiloxane, methyl siloxane, aminofunctional polydimethylsiloxane, aminoalkyl polydimethylsiloxane, polymethylsiloxane, potassium propylsilanetriolate, and combinations thereof.

In one embodiment, the acrylic resin comprises an emulsion or dispersion of polyacrylates, acrylic-styrene polymers, vinyl-acrylic polymers, or combinations thereof.

In one embodiment, the at least one silicon-containing oligomer or silicon-containing polymer is present in an amount of 0.01 to 5 pounds per ton of the roofing granules. In another embodiment, the at least one silicon-containing oligomer or silicon-containing polymer is present in an amount of 0.1 to 1 pounds per ton of the roofing granules. In some embodiments, the at least one silicon-containing oligomer or silicon-containing polymer is present in an amount of 0.5 to 1 pounds per ton of the roofing granules. In another embodiment, the at least one silicon-containing oligomer or silicon-containing polymer is present in an amount of 0.25 to 0.5 pounds per ton of the roofing granules.

In one embodiment, the acrylic resin is present in an amount of 0.1 to 10 pounds per ton of the roofing granules. In another embodiment, the acrylic resin is present in an amount of 0.5 to 2 pounds per ton of the roofing granules.

In one embodiment, the water is present in an amount of 5 to 100 pounds per ton of the roofing granules. In another embodiment, the water is present in an amount of 10 to 30 pounds per ton of the roofing granules. In some embodiments, the water is present in an amount of 20 to 30 pounds per ton of the roofing granules.

In one embodiment, the method further comprises heating the roofing granules prior to applying the coating to the roofing granules.

In one embodiment, the method further comprises preparing the coating by mixing (i) the water, (ii) the at least one silicon-containing oligomer or silicon-containing polymer, and (iii) the acrylic resin, to form the coating.

In one embodiment, the method further comprises applying a petroleum oil to the coated roofing granules. In another embodiment, the coated roofing granules are not treated with petroleum oil.

In one embodiment, the coating is applied to the roofing granules at a temperature of 70° F. to 520° F. In some embodiments, the coating is applied to the roofing granules at a temperature of 250° F. to 350° F.

Another embodiment of this invention pertains to a roofing granule that comprises (a) a granule and (b) a coating on the granule, with the coating comprising (i) at least one silicon-containing oligomer or silicon-containing polymer, and (ii) an acrylic resin having a glass transition temperature of −18° C. to 60° C., wherein the coating is substantially free of water. When the coated roofing granule is applied to an asphalt shingle, the coated roofing granule exhibits reduced staining as compared to a roofing granule that is treated with petroleum oil.

In one embodiment, the at least one silicon-containing oligomer or silicon-containing polymer is at least one of polyoctyltrimethoxysilane, potassium methyl siliconate, polymethylhydrogensiloxane, methyl siloxane, aminofunctional polydimethylsiloxane, aminoalkyl polydimethylsiloxane, polymethylsiloxane, potassium propylsilanetriolate, and combinations thereof.

In one embodiment, the acrylic resin comprises polyacrylates, acrylic-styrene polymers, vinyl-acrylic polymers, or combinations thereof.

The test methods used to determine the color, total solar reflectance, oil backoff, water repellency, dust, and stain of a roofing granule are detailed in Example 2 below.

In one embodiment, the roofing granule exhibits an amount of staining of 0 to 5 after 24 hours. According to one embodiment, the roofing granule exhibits an amount of staining of 0 to 7 after 4 days.

In one embodiment, the roofing granule exhibits a total solar reflectance that is improved as compared to a roofing granule that is treated with petroleum oil.

In one embodiment, the roofing granule exhibits a coloring that is improved as compared to a roofing granule that is treated with petroleum oil. In some embodiments, the roofing granule exhibits an L value, as measured by a Hunter L, a, and b color scale, that is 98 percent to 100 percent of an L value of the roofing granule without the coating. In another embodiment, the roofing granule exhibits a b value, as measured by a Hunter L, a, and b color scale, that is 80 percent to 95 percent of a b value of the roofing granule without the coating.

In one embodiment, the roofing granule exhibits a dust content that is improved as compared to a roofing granule that is treated with petroleum oil.

Another embodiment of this invention pertains to an asphalt roofing shingle that comprises (a) an asphalt shingle and (b) roofing granules applied to the asphalt shingle, wherein the roofing granules are coated with the coating comprising (i) at least one silicon-containing oligomer or silicon-containing polymer, and (ii) an acrylic resin having a glass transition temperature of −18° C. to 60° C., wherein the coating is substantially free of water. The roofing granules exhibit reduced staining as compared to roofing granules that are treated with petroleum oil.

In one embodiment, the at least one silicon-containing oligomer or silicon-containing polymer is at least one of polyoctyltrimethoxysilane, potassium methyl siliconate, polymethylhydrogensiloxane, methyl siloxane, aminofunctional polydimethylsiloxane, aminoalkyl polydimethylsiloxane, polymethylsiloxane, potassium propylsilanetriolate, and combinations thereof.

In one embodiment, the acrylic resin comprises polyacrylates, acrylic-styrene polymers, vinyl-acrylic polymers, or combinations thereof.

BRIEF DESCRIPTION OF THE FIGURES

For a more complete understanding of the invention and the advantages thereof, reference is made to the following descriptions, taken in conjunction with the accompanying figures, in which:

FIG. 1 is a Table illustrating various properties of coated roofing granules according to embodiments of the invention.

FIG. 2 is a Table illustrating various properties of coated roofing granules according to embodiments of the invention.

FIG. 3 is a Table illustrating various properties of coated roofing granules according to embodiments of the invention.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though they may. Furthermore, the phrases "in another embodiment" and "in some other embodiments" as used herein do not necessarily refer to a different embodiment, although they may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, terms such as "consisting of" and "composed of" limit the scope of a specific claim to the materials and steps recited by the claim.

All prior patents, publications, and test methods referenced herein are incorporated by reference in their entireties.

As used herein, a coating that is "substantially free of water" means that the coating does not include more than 1% by weight of water.

One embodiment of this invention pertains to a method of coating roofing granules that includes (a) obtaining roofing granules and (b) applying a coating to the roofing granules to form coated roofing granules, with the coating comprising (i) water, (ii) at least one silicon-containing oligomer or silicon-containing polymer, and (iii) an acrylic resin having a glass transition temperature of −18° C. to 60° C., wherein, when the coated roofing granules are applied to an asphalt shingle, the coated roofing granules exhibit reduced staining as compared to roofing granules that are treated with petroleum oil.

In one embodiment, the at least one silicon-containing oligomer or silicon-containing polymer is at least one of polyoctyltrimethoxysilane, potassium methyl siliconate, polymethylhydrogensiloxane, methyl siloxane, aminofunctional polydimethylsiloxane, aminoalkyl polydimethylsiloxane, polymethylsiloxane, potassium propylsilanetriolate, and combinations thereof. According to one embodiment, the silicon-containing oligomer or silicon-containing polymer is hydrophobic, water-dispersible, or emulsified, or combinations thereof. According to one embodiment, the silicon-containing oligomer or silicon-containing polymer is monomeric, oligomeric, and/or polymerized. Non-limiting examples of the silicon-containing oligomer or silicon-containing polymer include, but are not limited to, SIL-RES® BS68, which is a polyoctyltrimethoxysilane that is available from Wacker Chemie AG, Munich, Germany; SILRES® BS16, which is a potassium methyl siliconate that is available from Wacker Chemie AG, Munich, Germany; SILRES® BS94, which is a polymethylhydrogensiloxane that is available from Wacker Chemie AG, Munich, Germany; SILRES® BS1001A, which is an emulsified methyl siloxane that is available from Wacker Chemie AG, Munich, Germany; SILRES® BS1360, which is an emulsified aminofunctional polydimethylsiloxane that is available from Wacker Chemie AG, Munich, Germany; SILRES® BS1306, which is an emulsified aminoalkyl polydimethylsiloxane that is available from Wacker Chemie AG, Munich, Germany; and/or SILRES® BS45, which is an emulsified polymethylsiloxane that is available from Wacker Chemie AG, Munich, Germany.

In one embodiment, the acrylic resin comprises an emulsion or dispersion of polyacrylates, acrylic-styrene polymers, vinyl-acrylic polymers, or combinations thereof. Non-limiting examples of the acrylic resin include, but are not limited to, JONCRYL® 1987, which is an acrylic/styrene emulsion that is available from BASF SE, Ludwigshafen, Germany; JONCRYL® 2570, which is an acrylic emulsion that is available from BASF SE, Ludwigshafen, Germany; JONCRYL® 2561, which is an acrylic emulsion that is available from BASF SE, Ludwigshafen, Germany; RHOPLEX™ AC2540, which is an acrylic emulsion that is available from Dow Inc., Midland, Michigan; RHOPLEX™ EC2100, which is an acrylic emulsion that is available from Dow Inc., Midland, Michigan; RHOPLEX™ AC630, which is an acrylic emulsion that is available from Dow Inc., Midland, Michigan; ROVACE™ 10, which is a vinyl-acrylic emulsion that is available from Dow Inc., Midland, Michigan; ROVACE™ 661, which is a vinyl-acrylic emulsion that is available from Dow Inc., Midland, Michigan; ROVACE™ 9100, which is a vinyl-acrylic emulsion that is available from Dow Inc., Midland, Michigan; ROVACE™ 9900, which is a vinyl-acrylic emulsion that is available from Dow Inc., Midland, Michigan; and/or TAPE-X®, which is a vinyl-acrylic emulsion that is available from Dow Inc., Midland, Michigan.

According to one embodiment, the acrylic resin has a glass transition temperature of −18° C. to 60° C. In one embodiment, the acrylic resin has a glass transition temperature of −15° C. to 60° C. In one embodiment, the acrylic resin has a glass transition temperature of −10° C. to 60° C. In one embodiment, the acrylic resin has a glass transition temperature of −5° C. to 60° C. In one embodiment, the acrylic resin has a glass transition temperature of −1° C. to 60° C. In one embodiment, the acrylic resin has a glass transition temperature of 1° C. to 60° C. In one embodiment, the acrylic resin has a glass transition temperature of 5° C. to 60° C. In one embodiment, the acrylic resin has a glass transition temperature of 10° C. to 60° C. In one embodiment, the acrylic resin has a glass transition temperature of 15° C. to 60° C. In one embodiment, the acrylic resin has a glass transition temperature of 20° C. to 60° C. In one embodiment, the acrylic resin has a glass transition temperature of 30° C. to 60° C. In one embodiment, the acrylic resin has a glass transition temperature of 40° C. to 60° C. In one embodiment, the acrylic resin has a glass transition temperature of 50° C. to 60° C. In one embodiment, the acrylic resin has a glass transition temperature of −18° C. to 50° C. In one embodiment, the acrylic resin has a glass transition temperature of −18° C. to 40° C. In one embodiment, the acrylic resin has a glass transition temperature of −18° C. to 30° C. In one embodiment, the acrylic resin has a glass transition temperature of −18° C. to 20° C. In one embodiment, the acrylic resin has a glass transition temperature of −18° C. to 15° C. In one embodiment, the acrylic resin has a glass transition temperature of −18° C. to 10° C. In one embodiment, the acrylic resin has a glass transition temperature of −18° C. to 5° C. In one embodiment, the acrylic resin has a glass transition temperature of −15° C. to 5° C. In one embodiment, the acrylic resin has a glass transition temperature of −18° C. to 1° C. In one embodiment, the acrylic resin has a glass transition temperature of −15° C. to 50° C. In one embodiment, the acrylic resin has a glass transition temperature of −10° C. to 40° C. In one embodiment, the acrylic resin has a glass transition temperature of −5° C. to 30° C. In one embodiment, the acrylic resin has a glass transition temperature of −1° C. to 20° C. In one embodiment, the acrylic resin has a glass transition temperature of 1° C. to 10° C.

According to one embodiment, the acrylic resin has a film-forming property (i.e., a minimum film-forming temperature (MFFT) in the range of 0° C. to 20° C. (e.g., room temperature).

In one embodiment, the at least one silicon-containing oligomer or silicon-containing polymer is present in an amount of 0.01 to 5 pounds per ton (PPT) of the roofing granules. In one embodiment, the at least one silicon-containing oligomer or silicon-containing polymer is present in an amount of 0.05 to 5 PPT of the roofing granules. In one embodiment, the at least one silicon-containing oligomer or silicon-containing polymer is present in an amount of 0.1 to 5 PPT of the roofing granules. In one embodiment, the at least one silicon-containing oligomer or silicon-containing polymer is present in an amount of 0.25 to 5 PPT of the roofing granules. In one embodiment, the at least one silicon-containing oligomer or silicon-containing polymer is present in an amount of 0.5 to 5 PPT of the roofing granules. In one embodiment, the at least one silicon-containing oligomer or silicon-containing polymer is present in an amount of 1 to 5 PPT of the roofing granules. In one embodiment, the at least one silicon-containing oligomer or silicon-containing polymer is present in an amount of 2 to 5 PPT of the roofing granules. In one embodiment, the at least one silicon-containing oligomer or silicon-containing polymer is present in an amount of 3 to 5 PPT of the roofing granules. In one embodiment, the at least one silicon-containing oligomer or silicon-containing polymer is present in an amount of 4 to 5 PPT of the roofing granules. In one embodiment, the at least one silicon-containing oligomer or silicon-containing polymer is present in an amount of 0.01 to 4 PPT of the roofing granules. In one embodiment, the at least one silicon-containing oligomer or silicon-containing polymer is present in an amount of 0.01 to 3 PPT of the roofing granules. In one embodiment, the at least one silicon-containing oligomer or silicon-containing polymer is present in an amount of 0.01 to 3 PPT of the roofing granules. In one embodiment, the at least one silicon-containing oligomer or silicon-containing polymer is present in an amount of 0.01 to 2 PPT of the roofing granules. In one embodiment, the at least one silicon-containing oligomer or silicon-containing polymer is present in an amount of 0.01 to 1 PPT of the roofing granules. In one embodiment, the at least one silicon-containing oligomer or silicon-containing polymer is present in an amount of 0.01 to 0.5 PPT of the roofing granules. In one embodiment, the at least one silicon-containing oligomer or silicon-containing polymer is present in an amount of 0.01 to 0.25 PPT of the roofing granules. In one embodiment, the at least one silicon-containing oligomer or silicon-containing polymer is present in an amount of 0.01 to 0.1 PPT of the roofing granules. In one embodiment, the at least one silicon-containing oligomer or silicon-containing polymer is present in an amount of 0.01 to 0.05 PPT of the roofing granules. In one embodiment, the at least one silicon-containing oligomer or silicon-containing polymer is present in an amount of 0.05 to 4 PPT of the roofing granules. In one embodiment, the at least one silicon-containing oligomer or silicon-containing polymer is present in an amount of 0.25 to 3 PPT of the roofing granules. In one embodiment, the at least one silicon-containing oligomer or silicon-containing polymer is present in an amount of 0.5 to 2 PPT of the roofing granules. In one embodiment, the at least one silicon-containing oligomer or silicon-containing polymer is present in an amount of 1 to 3 PPT of the roofing granules.

In one embodiment, the acrylic resin is present in an amount of 0.1 to 10 PPT of the roofing granules. In one embodiment, the acrylic resin is present in an amount of 0.25 to 10 PPT of the roofing granules. In one embodiment, the acrylic resin is present in an amount of 0.5 to 10 PPT of the roofing granules. In one embodiment, the acrylic resin is present in an amount of 1 to 10 PPT of the roofing granules. In one embodiment, the acrylic resin is present in an amount of 2 to 10 PPT of the roofing granules. In one embodiment, the acrylic resin is present in an amount of 5 to 10 PPT of the roofing granules. In one embodiment, the acrylic resin is present in an amount of 8 to 10 PPT of the roofing granules. In one embodiment, the acrylic resin is present in an amount of 0.1 to 8 PPT of the roofing granules. In one embodiment, the acrylic resin is present in an amount of 0.1 to 5 PPT of the roofing granules. In one embodiment, the acrylic resin is present in an amount of 0.1 to 2 PPT of the roofing granules. In one embodiment, the acrylic resin is present in an amount of 0.1 to 1 PPT of the roofing granules. In one embodiment, the acrylic resin is present in an amount of 0.1 to 0.5 PPT of the roofing granules. In one embodiment, the acrylic resin is present in an amount of 0.1 to 0.25 PPT of the roofing granules. In one embodiment, the acrylic resin is present in an amount of 0.25 to 8 PPT of the roofing granules. In one embodiment, the acrylic resin is present in an amount of 0.5 to 5 PPT of the roofing granules. In one embodiment, the acrylic resin is present in an amount of 1 to 2 PPT of the roofing granules.

In one embodiment, the water is present in an amount of 5 to 100 PPT of the roofing granules. In one embodiment, the water is present in an amount of 10 to 100 PPT of the roofing granules. In one embodiment, the water is present in an amount of 15 to 100 PPT of the roofing granules. In one embodiment, the water is present in an amount of 20 to 100 PPT of the roofing granules. In one embodiment, the water is present in an amount of 30 to 100 PPT of the roofing granules. In one embodiment, the water is present in an amount of 40 to 100 PPT of the roofing granules. In one embodiment, the water is present in an amount of 50 to 100 PPT of the roofing granules. In one embodiment, the water is present in an amount of 60 to 100 PPT of the roofing granules. In one embodiment, the water is present in an amount of 70 to 100 PPT of the roofing granules. In one embodiment, the water is present in an amount of 80 to 100 PPT of the roofing granules. In one embodiment, the water is present in an amount of 90 to 100 PPT of the roofing granules. In one embodiment, the water is present in an amount of 5 to 90 PPT of the roofing granules. In one embodiment, the water is present in an amount of 5 to 80 PPT of the roofing granules. In one embodiment, the water is present in an amount of 5 to 70 PPT of the roofing granules. In one embodiment, the water is present in an amount of 5 to 60 PPT of the roofing granules. In one embodiment, the water is present in an amount of 5 to 50 PPT of the roofing granules. In one embodiment, the water is present in an amount of 5 to 40 PPT of the roofing granules. In one embodiment, the water is present in an amount of 5 to 30 PPT of the roofing granules. In one embodiment, the water is present in an amount of 5 to 20 PPT of the roofing granules. In one embodiment, the water is present in an amount of 5 to 15 PPT of the roofing granules. In one embodiment, the water is present in an amount of 5 to 10 PPT of the roofing granules. In one embodiment, the water is present in an amount of 10 to 90

PPT of the roofing granules. In one embodiment, the water is present in an amount of 15 to 80 PPT of the roofing granules. In one embodiment, the water is present in an amount of 20 to 70 PPT of the roofing granules. In one embodiment, the water is present in an amount of 30 to 60 PPT of the roofing granules. In one embodiment, the water is present in an amount of 40 to 50 PPT of the roofing granules.

In one embodiment, the method further comprises heating the roofing granules prior to applying the coating to the roofing granules. According to one embodiment, the roofing granules are heated to an elevated temperature of 100° F. to 520° F., prior to applying the coating to the roofing granules. According to one embodiment, the roofing granules are heated to an elevated temperature of 150° F. to 520° F. According to one embodiment, the roofing granules are heated to an elevated temperature of 165° F. to 520° F. According to one embodiment, the roofing granules are heated to an elevated temperature of 175° F. to 520° F. According to one embodiment, the roofing granules are heated to an elevated temperature of 200° F. to 520° F. According to one embodiment, the roofing granules are heated to an elevated temperature of 250° F. to 520° F. According to one embodiment, the roofing granules are heated to an elevated temperature of 300° F. to 520° F. According to one embodiment, the roofing granules are heated to an elevated temperature of 400° F. to 520° F. According to one embodiment, the roofing granules are heated to an elevated temperature of 500° F. to 520° F. According to one embodiment, the roofing granules are heated to an elevated temperature of 100° F. to 500° F., prior to applying the coating to the roofing granules. According to one embodiment, the roofing granules are heated to an elevated temperature of 150° F. to 500° F. According to one embodiment, the roofing granules are heated to an elevated temperature of 165° F. to 500° F. According to one embodiment, the roofing granules are heated to an elevated temperature of 175° F. to 500° F. According to one embodiment, the roofing granules are heated to an elevated temperature of 200° F. to 500° F. According to one embodiment, the roofing granules are heated to an elevated temperature of 250° F. to 500° F. According to one embodiment, the roofing granules are heated to an elevated temperature of 300° F. to 500° F. According to one embodiment, the roofing granules are heated to an elevated temperature of 400° F. to 500° F. According to one embodiment, the roofing granules are heated to an elevated temperature of 1500° F. to 400° F., prior to applying the coating to the roofing granules. According to one embodiment, the roofing granules are heated to an elevated temperature of 165° F. to 300° F. According to one embodiment, the roofing granules are heated to an elevated temperature of 175° F. to 250° F.

In one embodiment, the method further comprises preparing the coating by mixing (i) the water, (ii) the at least one silicon-containing oligomer or silicon-containing polymer, and (iii) the acrylic resin, to form the coating.

In one embodiment, the method further comprises applying a petroleum oil to the coated roofing granules. In one embodiment, the petroleum oil comprises naphthenic and paraffinic base oil. In another embodiment, the coated roofing granules are not treated with petroleum oil.

In one embodiment, the coating is applied to the roofing granules at a temperature of 70° F. to 520° F. In one embodiment, the coating is applied to the roofing granules at a temperature of 100° F. to 520° F. In one embodiment, the coating is applied to the roofing granules at a temperature of 250° F. to 520° F. In one embodiment, the coating is applied to the roofing granules at a temperature of 350° F. to 520° F. In one embodiment, the coating is applied to the roofing granules at a temperature of 450° F. to 520° F. In one embodiment, the coating is applied to the roofing granules at a temperature of 70° F. to 450° F. In one embodiment, the coating is applied to the roofing granules at a temperature of 70° F. to 350° F. In one embodiment, the coating is applied to the roofing granules at a temperature of 70° F. to 250° F. In one embodiment, the coating is applied to the roofing granules at a temperature of 70° F. to 100° F. In one embodiment, the coating is applied to the roofing granules at a temperature of 100° F. to 450° F. In one embodiment, the coating is applied to the roofing granules at a temperature of 250° F. to 350° F.

In one embodiment, the coated granules are dried at a temperature of 120° F. to 200° F. In one embodiment, the coated granules are dried at a temperature of 130° F. to 165° F.

Another embodiment of this invention pertains to a roofing granule that comprises (a) a granule and (b) a coating on the granule, with the coating comprising (i) at least one silicon-containing oligomer or silicon-containing polymer, and (ii) an acrylic resin having a glass transition temperature of −18° C. to 60° C., wherein the coating is substantially free of water, and wherein, when the coated roofing granule is applied to an asphalt shingle, the coated roofing granule exhibits reduced staining as compared to a roofing granule that is treated with petroleum oil.

In one embodiment, the acrylic resin comprises polyacrylates, acrylic-styrene polymers, vinyl-acrylic polymers, or combinations thereof.

In one embodiment, the roofing granule exhibits an amount of staining of 0 to 5 after 24 hours. In one embodiment, the roofing granule exhibits an amount of staining of 1 to 5 after 24 hours. In one embodiment, the roofing granule exhibits an amount of staining of 2 to 5 after 24 hours. In one embodiment, the roofing granule exhibits an amount of staining of 3 to 5 after 24 hours. In one embodiment, the roofing granule exhibits an amount of staining of 4 to 5 after 24 hours. In one embodiment, the roofing granule exhibits an amount of staining of 0 to 4 after 24 hours. In one embodiment, the roofing granule exhibits an amount of staining of 1 to 4 after 24 hours. In one embodiment, the roofing granule exhibits an amount of staining of 2 to 4 after 24 hours. In one embodiment, the roofing granule exhibits an amount of staining of 3 to 4 after 24 hours. In one embodiment, the roofing granule exhibits an amount of staining of 1 to 4 after 24 hours. In one embodiment, the roofing granule exhibits an amount of staining of 2 to 3 after 24 hours.

According to one embodiment, the roofing granule exhibits an amount of staining of 0 to 7 after 4 days. According to one embodiment, the roofing granule exhibits an amount of staining of 1 to 7 after 4 days. According to one embodiment, the roofing granule exhibits an amount of staining of 2 to 7 after 4 days. According to one embodiment, the roofing granule exhibits an amount of staining of 3 to 7 after 4 days. According to one embodiment, the roofing granule exhibits an amount of staining of 4 to 7 after 4 days. According to one embodiment, the roofing granule exhibits an amount of staining of 5 to 7 after 4 days. According to one embodiment, the roofing granule exhibits an amount of staining of 6 to 7 after 4 days. According to one embodiment, the roofing granule exhibits an amount of staining of 0 to 6 after 4 days. According to one embodiment, the roofing granule exhibits an amount of staining of 0 to 5 after 4 days. According to one embodiment, the roofing granule exhibits an amount of staining of 0 to 4 after 4 days. According to one embodiment, the roofing granule exhibits an amount of staining of 0 to 3 after 4 days. According to one embodiment, the roofing granule exhibits an amount of staining of 0 to 2 after 4 days. According to one embodiment, the roofing granule exhibits an amount of staining of 0 to 1 after 4 days. According to one embodiment, the roofing granule exhibits an amount of staining of 1 to 6 after 4 days. According to one embodiment, the roofing granule exhibits an amount of staining of 2 to 5 after 4 days. According to one embodiment, the roofing granule exhibits an amount of staining of 3 to 4 after 4 days.

In one embodiment, the roofing granule exhibits a total solar reflectance that is increased as compared to a roofing granule that is treated with petroleum oil.

In one embodiment, the roofing granule exhibits a coloring that is improved as compared to a roofing granule that is treated with petroleum oil. In some embodiments, the roofing granule exhibits an L value, as measured by a Hunter L, a, and b color scale, that is 80 percent to 100 percent of an L value of the roofing granule without the coating. In some embodiments, the roofing granule exhibits an L value, as measured by a Hunter L, a, and b color scale, that is 85 percent to 100 percent of an L value of the roofing granule without the coating. In some embodiments, the roofing granule exhibits an L value, as measured by a Hunter L, a, and b color scale, that is 90 percent to 100 percent of an L value of the roofing granule without the coating. In some embodiments, the roofing granule exhibits an L value, as measured by a Hunter L, a, and b color scale, that is 95 percent to 100 percent of an L value of the roofing granule without the coating. In some embodiments, the roofing granule exhibits an L value, as measured by a Hunter L, a, and b color scale, that is 98 percent to 100 percent of an L value of the roofing granule without the coating.

In another embodiment, the roofing granule exhibits a b value, as measured by a Hunter L, a, and b color scale, that is 70 percent to 95 percent of a b value of the roofing granule without the coating. In some embodiments, the roofing granule exhibits a b value, as measured by a Hunter L, a, and b color scale, that is 75 percent to 95 percent of a b value of the roofing granule without the coating. In some embodiments, the roofing granule exhibits a b value, as measured by a Hunter L, a, and b color scale, that is 80 percent to 95 percent of a b value of the roofing granule without the coating. In some embodiments, the roofing granule exhibits a b value, as measured by a Hunter L, a, and b color scale, that is 85 percent to 95 percent of a b value of the roofing granule without the coating. In some embodiments, the roofing granule exhibits a b value, as measured by a Hunter L, a, and b color scale, that is 90 percent to 95 percent of a b value of the roofing granule without the coating.

In one embodiment, the roofing granule exhibits a dust content that is reduced as compared to a roofing granule that is treated with petroleum oil. In some embodiments, the roofing granule exhibits a dust content of 0 to 10. In some embodiments, the roofing granule exhibits a dust content of 1 to 10. In some embodiments, the roofing granule exhibits a dust content of 2 to 10. In some embodiments, the roofing granule exhibits a dust content of 3 to 10. In some embodiments, the roofing granule exhibits a dust content of 4 to 10. In some embodiments, the roofing granule exhibits a dust content of 5 to 10. In some embodiments, the roofing granule exhibits a dust content of 6 to 10. In some embodiments, the roofing granule exhibits a dust content of 7 to 10. In some embodiments, the roofing granule exhibits a dust content of 8 to 10. In some embodiments, the roofing granule exhibits a dust content of 9 to 10.

One embodiment of this invention pertains to an asphalt roofing shingle that comprises (a) an asphalt shingle and (b) roofing granules applied to the asphalt shingle, wherein the roofing granules are coated with the coating comprising (i) at least one silicon-containing oligomer or silicon-containing polymer, and (ii) an acrylic resin having a glass transition temperature of −18° C. to 60° C., wherein the coating is substantially free of water, and wherein the roofing granules exhibit reduced staining as compared to roofing granules that are treated with petroleum oil.

In one embodiment, the asphalt shingle includes a substrate. According to one embodiment, the substrate comprises one of a fiberglass mat or a polyester mat. In an embodiment, the substrate comprises one of a fiberglass mat, a polyester mat, a scrim, a coated scrim, or a combination thereof. In an embodiment, the substrate comprises a fiberglass mat, a polyester mat, a scrim, a coated scrim, and/or other synthetic or natural scrims. In another embodiment, the asphalt shingle does not comprise a substrate.

According to one embodiment, the asphalt shingle is one of (i) a single layer shingle or (ii) a laminated shingle having two or more layers.

The present invention provides an aqueous post-treatment of roofing granules using an aqueous coating having improved dispersion of active ingredients (e.g., a siloxane and an acrylic polymer), as well as improved control of dosage level by dilution with water and the ability to use easier physical dispersion methods, such as, e.g., spraying. The coated roofing granules prepared with the inventive aqueous post-treatment exhibit reduced staining, improved color, improved solar reflectance, water repellency, and/or reduced dust content, as compared to traditional roofing granules that are treated with petroleum oil.

EXAMPLES

Specific embodiments of the invention will now be demonstrated by reference to the following examples. It should be understood that these examples are disclosed by way of illustrating the invention and should not be taken in any way to limit the scope of the present invention.

Example 1

Table 1 shows the aqueous coating compositions of Example 1. The aqueous coatings were prepared, prior to application to roofing granules, by combining and agitating the components in a lab mixer. The aqueous coatings were then applied to roofing granules. After the application, the granules were dried with a hot air gun.

TABLE 1

| Aqueous Coating Compositions | % Active Solids | Coating 1 | Coating 2 | Coating 3 |
|---|---|---|---|---|
| Water | — | 22.68 | 22.68 | 22.5 |
| Siloxane (BS16) | 34 | 0.5 | 0.5 | 0.5 |
| Acrylic Resin (AC2540) | 55 | 1.82 | | |
| Acrylic Resin (EC2100) | 55 | | 1.82 | |
| Acrylic Resin (AC630) | 50 | | | 2 |
| TOTAL | | 25 | 25 | 25 |

All material quantities are pounds per ton (PPT) of the roofing granules.

Example 2

The Table of FIG. 1 shows the aqueous coating compositions of Example 2. The aqueous coatings were prepared in the same manner as discussed above with respect to Example 1. The prepared aqueous coatings were then applied to roofing granules by spraying the roofing granules with the aqueous coatings, while the granules were agitated in a rotating drum, e.g., a cement mixer. Prior and during application, the roofing granules were heated to about 165° F. After the application, the granules were dried with a hot air gun.

The various coated roofing granules of embodiments of the invention (using various types of acrylic resins in the coating compositions) and their properties (i.e., granule color and total solar reflectance (TSR), prior to and after oil backoff, water repellency, dust (as made and after oil backoff), and stain after 24 hours) are shown in the Table of FIG. 1 in comparison to control roofing granules that are coated with a traditional coating of siloxane and petroleum oil (i.e., naphthenic and paraffinic base oil). The control roofing granules were prepared by adding the siloxane and petroleum oil (i.e., naphthenic and paraffinic base oil) on top of a bed of granules and distributing the mixture using a standard paint shaker.

The test methods for each of the properties tested of the various coated roofing granules are as follows:

Color

Color is measured using the Hunter L, a, and b color scale, utilizing a HunterLab LabScan XE Colorimeter (HunterLab, Reston, VA). Color is expressed as L, a, and b values. The L value indicates the "lightness" and ranges from 0 to 100, or black to white, respectively. The a- and b-values indicate the "off white" shades and quantify the green to red and blue to yellow scales, respectively. The value for color is dimensionless (i.e., has no units).

Granule color is measured on a flat bed of granules dispersed in a shallow container. The granules are dispersed in a shallow container by tamping a pile of the material into a compacted, level surface.

Total Solar Reflectance (TSR)

Total Solar Reflectance (TSR) quantifies the portion of reflected incident solar radiation. The extent to which solar radiation affects surface temperature depends on the solar reflectance of the exposed surface. TSR values, which are dimensionless, range from 0.00 (none reflected) to 1.00 (100% reflected). Solar reflectance is measured in accordance with ASTM C1549-09 using a Solar Spectrum Reflectometer model SSE-ER from Devices and Services (Dallas, TX). Granule samples are prepared in the same fashion as for color measurement.

Oil Backoff

Oil backoff assesses color change due to storage. The color is measured in the same manner as discussed above. The test involves exposure of oiled granules to elevated temperature for a set timeframe, e.g., 165° F. for seven days. Oil backoff-color is measured after the exposure.

Water Repellency

Water repellency is an assessment of the degree water is repelled by the granules. The test is performed by measuring the time it takes for water to break through a pile of granules. A specified quantity of granules is piled in a volcano-shaped heap with an indented center on a paraffin wax-treated petri dish filled with a specified amount of water on the outside. The time for water to break through to the center of the granule pile is measured in minutes.

Dust

Airborne dust assesses relative dust levels of granules generated by handling under controlled conditions. A quantified sample is placed in a dust meter that is composed of a rotating drum with controlled air flow that carries liberated airborne dust through a specified glass microfiber filter. Test time, rotational speed, and airflow are specified. The instrument used is the Heubach Dustmeter device (Heubach GmbH, Langelsheim, Germany) with a Type I dust test attachment. The dust content is quantified as the fraction of dust in the sample captured by the filter. This weight fraction is expressed in parts per million (ppm).

Stain

Stain potential is a relative measure of degradation of the whiteness and/or reflectance of the roofing granules caused by the absorption of asphaltic oils. It is determined by applying roofing granules onto an asphalt-covered inert substrate, e.g., a metal coupon and exposing it to elevated temperatures. Stain is determined on a scale of 0 to 10 (none to excessive) by comparison with reference standards.

The test results shown in the Table of FIG. 1 illustrate that the coated roofing granules of embodiments of this invention have improved properties of color, TSR, oil backoff, and water repellency, as well as reduced dust and stain, compared to the control roofing granules that are coated with a traditional coating of siloxane and petroleum oil. The test results shown in the Table of FIG. 1 further illustrate that a variety of acrylic resins can be used in the coating composition of embodiments of the invention and achieve the improved properties discussed above.

Example 3

Table 2 shows the aqueous coating compositions of Example 3. The aqueous coatings were prepared, prior to application to roofing granules, by combining and agitating the components in a lab mixer. The aqueous coatings were then applied to roofing granules in the same manner as described above with respect to Example 2. In this example, the aqueous coatings contained only water-borne siloxanes and the coated granules were evaluated with respect to water repellency, in the manner described above.

The test results shown in Table 2 above indicate that all of the prepared coated roofing granules exhibited excellent water repellency, irrespective of the type of water-borne siloxane that was included in the prepared aqueous coating.

Example 4

The Table of FIG. 2 shows the aqueous coating compositions of Example 4. The aqueous coatings were prepared in the same manner as discussed above with respect to Example 1. The aqueous coatings were then applied to roofing granules in the same manner as discussed above with respect to Example 2.

The various coated roofing granules of embodiments of the invention (using varying levels of active ingredients, i.e., water, acrylic resin, and siloxane) and their properties (i.e., granule color and total solar reflectance (TSR), prior to and after oil backoff, water repellency, dust (as made and after oil backoff), and stain after 24 hours and after 4 days) are shown in the Table of FIG. 2 in comparison to control roofing granules that are coated with a traditional coating of siloxane and petroleum oil (i.e., naphthenic and paraffinic base oil). The control roofing granules were prepared by adding the siloxane and petroleum oil (i.e., naphthenic and paraffinic base oil) on top of a bed of granules and distributing the mixture using a standard paint shaker. The test methods for each of the properties tested of the various coated roofing granules shown in the Table of FIG. 2 are described above.

The test results shown in the Table of FIG. 2 illustrate that the coated roofing granules of this invention have improved properties of color, TSR, oil backoff, and water repellency, as well as reduced dust and stain, compared to the control roofing granules that are coated with a traditional coating of siloxane and petroleum oil.

Example 5

Table 3A and Table 3B shows the aqueous coating compositions of Example 5. The aqueous coatings were prepared in the same manner as discussed above with respect to Example 1. The aqueous coatings were then applied to roofing granules in the same manner as discussed above with respect to Example 2, except that the roofing granules were preheated to an elevated temperature of 518° F., prior to application of the aqueous coating.

The various coated roofing granules of embodiments of the invention (using varying levels of active ingredients, i.e., water, acrylic resin, and siloxane) and their properties (i.e., granule color (prior to and after coating), water repellency, dust (as made and after oil backoff), and stain after 24 hours and after 4 days) are shown in Table 3A and Table 3B below. The test methods for each of the properties tested of the various coated roofing granules shown in Table 3A and Table 3B below are described above.

TABLE 2

| Granules | Coating 1 | Coating 2 | Coating 3 | Coating 4 | Coating 5 |
|---|---|---|---|---|---|
| Water | 20 | 20 | 20 | 20 | 20 |
| BS16 | 0.25 | | | | |
| BS1001A | | 0.17 | | | |
| BS1360 | | | 0.13 | | |
| BS1306 | | | | 0.15 | |
| BS45 | | | | | 0.17 |
| TOTAL | 20.25 | 20.17 | 20.13 | 20.15 | 20.17 |
| Water Repellency (Min) | 60+ | 60+ | 60+ | 60+ | 60+ |

All material quantities are pounds per ton (PPT) of the roofing granules.

TABLE 3A

| | Units | Coating 1 | Coating 2 | Coating 3 | Coating 4 | Coating 5 |
|---|---|---|---|---|---|---|
| Granule Color | L | 43.29 | 43.29 | 43.29 | 43.29 | 43.29 |
| | A | −2.97 | −2.97 | −2.97 | −2.97 | −2.97 |
| | B | 2.61 | 2.61 | 2.61 | 2.61 | 2.61 |
| Dust | PPM | 32 | 32 | 32 | 32 | 32 |
| Preheat Temp | ° F. | 518 | 518 | 518 | 518 | 518 |
| Post Treatment PPT | | | | | | |
| Water | PPT | 20 | 30 | 50 | 70 | 100 |
| BS16 | PPT | 0.5 | 0.5 | 0.5 | 0.5 | 0.5 |
| Rhoplex AC630 | PPT | 2 | 2 | 2 | 2 | 2 |
| TOTAL | PPT | 22.5 | 32.5 | 52.5 | 72.5 | 102.5 |
| Post Treatment Testing | | | | | | |
| Granule Color | L | 43.0 | 43.1 | 42.1 | 42.9 | 42.4 |
| | a | −3.0 | −3.0 | −2.9 | −3.0 | −2.9 |
| | b | 2.9 | 3.0 | 3.0 | 3.1 | 2.9 |
| Water Repellency | Min | 0 | 0 | 6 | 47 | 60+ |
| Dust, as made | PPM | 21 | 19 | 19 | 14 | 16 |
| Dust, after backoff | PPM | 33 | 30 | 26 | 14 | 22 |
| Stain (24 hr) | | 5 | 4 | 2 | 1 | 0 |
| Stain (4 days) | | 8 | 7 | 5 | 4 | 2 |

All material quantities are pounds per ton (PPT) of the roofing granules.

TABLE 3B

| Control Granule | Units | Coating 6 | Coating 7 | Coating 8 | Coating 9 | Coating 10 |
|---|---|---|---|---|---|---|
| Granule Color | L | 52.3 | 52.3 | 52.3 | 52.3 | 52.3 |
| | a | −1.8 | −1.8 | −1.8 | −1.8 | −1.8 |
| | b | −1.5 | −1.5 | −1.5 | −1.5 | −1.5 |
| Dust | PPM | 39 | 39 | 39 | 39 | 39 |
| Preheat Temp | ° F. | 518 | 518 | 518 | 518 | 518 |
| Post Treatment PPT | | | | | | |
| Water | PPT | 20 | 30 | 50 | 70 | 100 |
| BS16 | PPT | 0.5 | 0.5 | 0.5 | 0.5 | 0.5 |
| Rhoplex AC630 | PPT | 2 | 2 | 2 | 2 | 2 |
| TOTAL | PPT | 22.5 | 32.5 | 52.5 | 72.5 | 102.5 |
| Post Treatment Testing | | | | | | |
| Granule Color | L | 51.3 | 51.1 | 51.1 | 51.2 | 50.9 |
| | a | −2.1 | −2.1 | −2.1 | −2.1 | −2.1 |
| | b | −1.0 | −1.0 | −0.9 | −0.9 | −1.0 |
| Water Repellency | Min | 0 | 0 | 0.5 | 9 | 24 |
| Dust, as made | PPM | 13 | 10 | 15 | 10 | 12 |
| Dust, after backoff | PPM | 21 | 12 | 11 | 12 | 4 |
| Stain (24 hr) | | 7 | 6 | 5 | 2 | 1 |
| Stain (4 days) | | 9 | 8 | 7 | 7 | 6 |

All material quantities are pounds per ton (PPT) of the roofing granules.

The test results shown in Table 3A and Table 3B above indicate that all of the prepared coated roofing granules exhibit excellent properties regarding color, dust, water repellency, and stain, even when the granules are preheated to an elevated temperature of 518° F., prior to application of the aqueous coating.

Example 6

The Table of FIG. 3 shows the aqueous coating compositions of Example 6. The aqueous coatings were prepared in the same manner as discussed above with respect to Example 1. The aqueous coatings were then applied to roofing granules in the same manner as discussed above with respect to Example 2. In this example, after (i) applying the aqueous coating to the roofing granules and (ii) drying the coated roofing granules, a "top dressing" of a petroleum oil (i.e., naphthenic and paraffinic base oil) was topically applied to the coated and dried roofing granules, while the granules were agitating. The treatment is referred to as "top dressing."

The coated roofing granules of embodiments of the invention (using varying levels of "top dressing" and three types of granules that have differences in color (i.e., Coating 1—Control and C1(1) to C5(1); Coating 2—Control and C1(2) to C5(2); and Coating 3—Control and C1(3) to C6(3))) and their properties (i.e., granule color (prior to and after oil backoff), water repellency, dust, and stain after 24 hours and after 4 days) are shown in the Table of FIG. 3 in comparison to control roofing granules that are coated with a traditional coating of siloxane and petroleum oil (i.e., naphthenic and paraffinic base oil). The control roofing granules were prepared by adding the siloxane and petroleum oil (i.e., naphthenic and paraffinic base oil) on top of a bed of granules and distributing the mixture using a standard paint shaker. The test methods for each of the properties tested of the various coated roofing granules shown in the Table of FIG. 3 are described above.

The test results shown in the Table of FIG. 3 illustrate that the coated roofing granules of this invention have improved properties of color and oil backoff, as well as reduced dust and stain, compared to the control roofing granules that are coated with a traditional coating of siloxane and petroleum oil, even after applying a "top dressing" to the coated roofing granules of embodiments of the invention.

Although the invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

We claim:

1. A coated roofing granule comprising:
(a) a roofing granule; and
(b) a post-treatment coating on the roofing granule, the post-treatment coating comprising:
(i) at least one silicon-containing oligomer or silicon-containing polymer that is present in an amount of 0.01 to 5 pounds per ton of roofing granule; and
(ii) an acrylic resin that is present in an amount of 0.1 to 5 pounds per ton of roofing granules,
wherein the coating is substantially free of water.

2. The coated roofing granule according to claim 1, wherein the coated roofing granule exhibits a total solar reflectance that is 90 percent to 100 percent of the total solar reflectance of the roofing granule without the post-treatment coating.

3. The coated roofing granule according to claim 2, wherein the coated roofing granule exhibits a total solar reflectance that is equal to the total solar reflectance of the roofing granule without the post-treatment coating.

4. The coated roofing granule according to claim 1, wherein the coated roofing granule exhibits a granule color having an L value, as measured by a Hunter L, a, and b color scale, that is 90 percent to 100 percent of an L value of the roofing granule without the post-treatment coating.

5. The coated roofing granule according to claim 1, wherein the coated roofing granule exhibits a granule color having a b value, as measured by a Hunter L, a, and b color scale, that is 70 percent to 95 percent of a b value of the roofing granule without the post-treatment coating.

6. The coated roofing granule according to claim 5, wherein the coated roofing granule exhibits a granule color having a b value, as measured by a Hunter L, a, and b color scale, that is 85 percent to 95 percent of a b value of the roofing granule without the post-treatment coating.

7. The coated roofing granule according to claim 1, wherein the at least one silicon-containing oligomer or silicon-containing polymer is at least one of polyoctylt-rimethoxysilane, potassium methyl siliconate, polymethyl-hydrogensiloxane, methyl siloxane, aminofunctional polydi-methylsiloxane, aminoalkyl polydimethylsiloxane, polymethylsiloxane, potassium propylsilanetriolate, and combinations thereof.

8. The coated roofing granule according to claim 1, wherein the acrylic resin comprises polyacrylates, acrylic-styrene polymers, vinyl-acrylic polymers, an aqueous acrylic emulsion, or combinations thereof.

9. The coated roofing granule according to claim 1, wherein the coated roofing granule exhibits an amount of staining of 0 to 5 after 24 hours.

10. The coated roofing granule according to claim 1, wherein the at least one silicon-containing oligomer or silicon-containing polymer is present in an amount of 0.01 to pounds 1 pound per ton of roofing granules.

11. The coated roofing granule according to claim 1, wherein the acrylic resin is present in an amount of 0.1 to 2 pounds per ton of roofing granules.

12. The coated roofing granule according to claim 1, wherein the coated roofing granule exhibits a dust content of 1 to 10.

13. The coated roofing granule according to claim 1, wherein the roofing granule is a preheated granule that is preheated to an elevated temperature of 70° F. to 520° F.

14. A roofing material comprising:
(a) a substrate;
(b) coated roofing granules applied to the substrate;
wherein the coated roofing granules comprise roofing granules coated with a post-treatment coating comprising:
(i) at least one silicon-containing oligomer or silicon-containing polymer that is present in an amount of 0.01 to 5 pounds per ton of roofing granule, and
(ii) an acrylic resin that is present in an amount of 0.1 to 5 pounds per ton of roofing granules,
wherein the coating is substantially free of water.

15. The roofing material according to claim 14, wherein the coated roofing granules further comprise petroleum oil.

16. The roofing material according to claim 14, wherein the coated roofing granules exhibit a total solar reflectance that is 90 percent to 100 percent of the total solar reflectance of the roofing granules without the post-treatment coating.

17. The roofing material according to claim 16, wherein the coated roofing granules exhibit a total solar reflectance that is equal to the total solar reflectance of the roofing granules without the post-treatment coating.

18. The roofing material according to claim 14, wherein the coated roofing granules exhibit a granule color having an L value, as measured by a Hunter L, a, and b color scale, that is 90 percent to 100 percent of an L value of the roofing granules without the post-treatment coating.

19. The roofing material according to claim 14, wherein the coated roofing granules exhibit a granule color having a b value, as measured by a Hunter L, a, and b color scale, that is 70 percent to 95 percent of a b value of the roofing granules without the post-treatment coating.

20. The roofing material according to claim 19, wherein the coated roofing granules exhibit a granule color having a b value, as measured by a Hunter L, a, and b color scale, that is 85 percent to 95 percent of a b value of the roofing granules without the post-treatment coating.

21. The roofing material according to claim 14, wherein the at least one silicon-containing oligomer or silicon-containing polymer is at least one of polyoctyltrimethoxysilane, potassium methyl siliconate, polymethylhydrogensiloxane, methyl siloxane, aminofunctional polydimethylsiloxane, aminoalkyl polydimethylsiloxane, polymethylsiloxane, potassium propylsilanetriolate, and combinations thereof.

22. The roofing material according to claim 14, wherein the acrylic resin comprises polyacrylates, acrylic-styrene polymers, vinyl-acrylic polymers, an aqueous acrylic emulsion, or combinations thereof.

23. The roofing material according to claim 14, wherein the coated roofing granules exhibit an amount of staining of 0 to 5 after 24 hours.

24. The roofing material according to claim 14, wherein the at least one silicon-containing oligomer or silicon-containing polymer is present in an amount of 0.01 to 1 pound per ton of roofing granules.

25. The roofing material according to claim 14, wherein the acrylic resin is present in an amount of 0.1 to 2 pounds per ton of roofing granules.

26. The roofing material according to claim 14, wherein the coated roofing granules exhibit a dust content of 1 to 10.

27. The roofing material according to claim 14, wherein the roofing material comprises a roofing shingle.

* * * * *